US012673364B2

(12) United States Patent
Okimoto et al.

(10) Patent No.: US 12,673,364 B2
(45) Date of Patent: Jul. 7, 2026

(54) GREEN COMPACT CONVEYING MECHANISM AND GREEN COMPACT FORMING DEVICE

(71) Applicant: Panasonic Intellectual Property Management Co., Ltd., Osaka (JP)

(72) Inventors: Rikiya Okimoto, Osaka (JP); Yosuke Takayama, Osaka (JP); Hitoshi Tani, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 385 days.

(21) Appl. No.: 18/278,575

(22) PCT Filed: Jan. 18, 2022

(86) PCT No.: PCT/JP2022/001548
§ 371 (c)(1),
(2) Date: Aug. 23, 2023

(87) PCT Pub. No.: WO2022/185754
PCT Pub. Date: Sep. 9, 2022

(65) Prior Publication Data

US 2024/0131582 A1 Apr. 25, 2024
US 2024/0227005 A9 Jul. 11, 2024

(30) Foreign Application Priority Data

Mar. 3, 2021 (JP) ................................ 2021-033112

(51) Int. Cl.

| | |
|---|---|
| ***B22F 3/18*** | (2006.01) |
| ***B30B 3/04*** | (2006.01) |
| ***B30B 11/00*** | (2006.01) |
| ***B30B 15/34*** | (2006.01) |

(52) U.S. Cl.
CPC .................. *B22F 3/18* (2013.01); *B30B 3/04* (2013.01); *B30B 11/006* (2013.01); *B30B 15/34* (2013.01); *B22F 2003/185* (2013.01)

(58) Field of Classification Search
None
See application file for complete search history.

(56) References Cited

FOREIGN PATENT DOCUMENTS

| | | | |
|---|---|---|---|
| JP | S62142099 A * | | 6/1987 |
| JP | H06-322409 A | | 11/1994 |
| JP | 2000-328107 A | | 11/2000 |
| JP | 2019-157227 | | 9/2019 |

OTHER PUBLICATIONS

International Search Report issued in corresponding International Application No. PCT/JP2022/001548, dated Apr. 12, 1 2022 with English translation.

* cited by examiner

*Primary Examiner* — Anthony M Liang
(74) *Attorney, Agent, or Firm* — RIMON P.C.

(57) ABSTRACT

A green compact conveying mechanism includes: a conveyance path for a green compact obtained by compressively forming powder in a sheet shape; an extrusion part that sends the green compact to the downstream side of the conveyance path by extruding the green compact; and a buckling inducing part that is arranged in the conveyance path, causes the green compact to be easily bent locally, and induces buckling at that site.

8 Claims, 5 Drawing Sheets

GREEN COMPACT CONVEYING MECHANISM AND GREEN COMPACT FORMING DEVICE

CROSS-REFERENCE TO RELATED APPLICATIONS

This application is the U.S. National Phase under 35 U.S.C. § 371 of International Patent Application No. PCT/JP2022/001548, filed on Jan. 18, 2022, which in turn claims the benefit of Japanese Patent Application No. 2021-033112, filed on Mar. 3, 2021, the entire content of each of which is incorporated herein by reference.

BACKGROUND

Field of the Invention

The present disclosure relates to green compact conveying mechanisms and green compact forming devices.

Description of the Related Art

Patent Literature 1 discloses a fine particle sintering device for producing a sintered body by passing raw material fine particles through pressurizing rolls so as to form the raw material fine particles into a plate shape, conveying the formed green compact to a heating and compression unit by a conveyor, and heating and pressurizing the green compact by the heating and compression unit.

Patent Literature 1: Japanese Unexamined Patent Application Publication No. 2019-157227

Conveyors, which are commonly used as a conveying mechanism for goods, have a complex structure and are relatively expensive since the conveyors themselves are provided with a drive system. For this reason, the structure of a powder sintering device equipped with a conveyor may become complicated and expensive. On the other hand, if the extrusion force of pressurizing rolls is used to convey a green compact, the structure of the conveying mechanism and even a device equipped with the conveying mechanism can be simplified, and the cost can be reduced.

However, when conveying the green compact by the extrusion force of the pressurizing rolls, the green compact may bend and eventually result in buckling if clogging of the conveying path or the like happens. If buckling occurs in the green compact, it becomes difficult for the extrusion force of the pressurizing rolls to be evenly transmitted to the downstream side of the buckling site. As a result, the conveyance of the green compact becomes stagnant. Meanwhile, it is difficult to know which part of the green compact the buckling occurs. Therefore, every time the conveyance of the green compact becomes stagnant, the buckled part must be located and removed. Since the conveyance distance of the green compact can be as long as ten meters or more, it takes a lot of time and effort to restore the conveyance of the green compact, and the operating rate of the conveying mechanism can be reduced.

SUMMARY OF THE INVENTION

In this background, a purpose of the present disclosure is to provide a technology for improving the operating rate of the conveying mechanism.

One embodiment of the present disclosure relates to a green compact conveying mechanism. This mechanism includes: a conveyance path for a green compact obtained by compressively forming powder in a sheet shape; an extrusion part that sends the green compact to the downstream side of the conveyance path by extruding the green compact; and a buckling inducing part that is arranged in the conveyance path, causes the green compact to be easily bent locally, and induces buckling at that site.

Another embodiment of the present disclosure relates to a green compact forming device. This device includes: press rolls that compressively form powder into a sheet shape; and the green compact conveying mechanism according to the embodiment, wherein the press rolls serve as the extrusion part of the green compact conveying mechanism.

Optional combinations of the aforementioned constituting elements, and implementations of the present disclosure in the form of methods, apparatuses, and systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figures 1A, 1B:
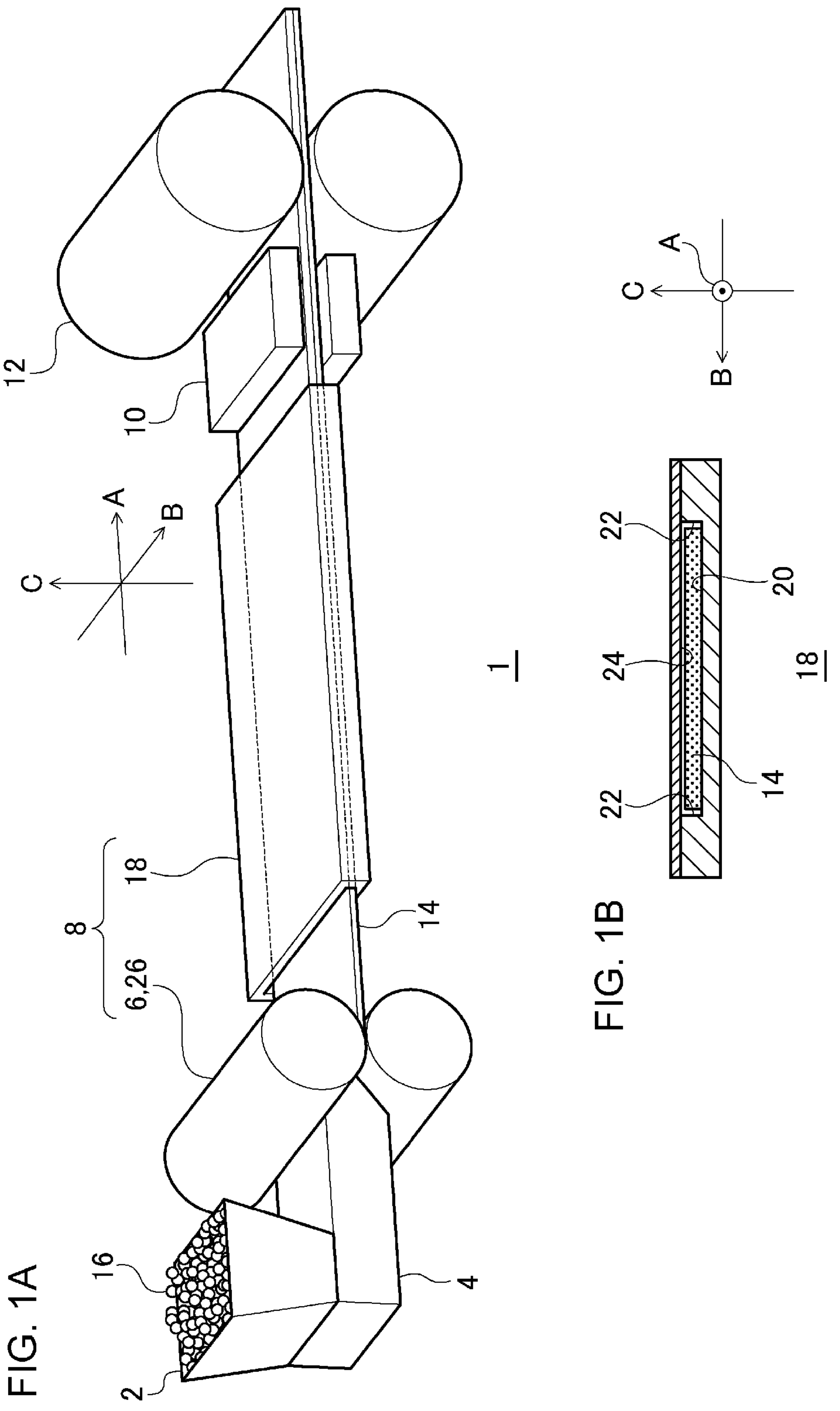
FIG. 1A is a perspective view schematically showing a green compact forming device according to an embodiment.
FIG. 1B is a cross-sectional view of a conveyance path.

Hereinafter, the present disclosure will be described based on a preferred embodiment with reference to the figures. The embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

FIG. 1A is a perspective view schematically showing a green compact forming device 1 according to an embodiment. FIG. 1B is a cross-sectional view of a conveyance path 18. The green compact forming device 1 includes a hopper 2, a feeder 4, press rolls 6, a green compact conveying mechanism 8, a preheating furnace 10, and heat press rolls 12.

The hopper 2 stores powder 16, which is the raw material for a green compact 14. The material of the powder 16 is, for example, an aggregate of particles with a particle diameter smaller than 100 μm, and the particle size distribution is not particularly limited.

The powder 16 is supplied from the hopper 2 to the feeder 4. The feeder 4 can consist of a publicly-known screw feeder or the like. The feeder 4 feeds the powder 16 to press rolls 6. The press rolls 6 in the present embodiment include a pair of rolls arranged at a predetermined distance. As the powder 16 passes between the pair of rolls, the powder 16 is compressively formed into a sheet shape. This allows a sheet-like green compact 14 to be obtained. By pressing the powder 16 by the press rolls 6 so as to form the green compact 14, a strength that substantially prevents the green compact 14 from collapsing even when conveyed is given to the green compact 14. The green compact 14 is continuously fed from the press rolls 6 to the conveyance path 18. Therefore, the green compact 14 is a strip shape that is long in the conveyance direction A.

The conveyance path 18 according to the present embodiment has a tunnel shape that extends in the conveyance direction A of the green compact 14 and guides the progress of the green compact 14. By making the conveyance path 18 to have a tunnel shape, the shape of the green compact 14 during conveyance can be easily maintained. As an example, the conveyance path 18 extends horizontally.

The conveyance path 18 has a floor surface 20, a pair of side surfaces 22, and a ceiling surface 24. The green compact 14 slides on the floor surface 20 in the conveyance direction A. The pair of side surfaces 22 are aligned in the width direction B of the green compact 14 orthogonal to the conveyance direction A. The ceiling surface 24 faces the floor surface 20 in a vertical direction C perpendicular to the conveyance direction A and the width direction B. The floor surface 20, the pair of side surfaces 22, and the ceiling surface 24 form a passage for the green compact 14. The space between the pair of side surfaces 22 is set slightly larger than the dimension of the green compact 14 in the width direction B such that the green compact 14 can smoothly travel in the passage. The space between the floor surface 20 and the ceiling surface 24 is set slightly larger than the dimension of the green compact 14 in the vertical direction C. Therefore, a gap is formed between the green compact 14 and the ceiling surface 24.

The conveyance path 18 forms the green compact conveying mechanism 8. In addition to the conveyance path 18, the green compact conveying mechanism 8 includes an extrusion part 26. The extrusion part 26 sends the green compact 14 to the downstream side of the conveyance path 18 by pushing the green compact 14 in the conveyance direction A. In the present embodiment, the press rolls 6 serve as the extrusion part 26 of the green compact conveying mechanism 8. The extrusion part 26 may be provided separately from the press rolls 6. The structure of the green compact conveying mechanism 8 will be explained in detail later.

The green compact 14 reaches the preheating furnace 10 through the conveyance path 18. The preheating furnace 10 heats the green compact 14 to a predetermined temperature, for example, between around 400° C. and 800° C., before heating and compressing the green compact 14 with the heat press rolls 12. The preheating furnace 10 can consist of a publicly-known heater or the like. The green compact 14 heated in the preheating furnace 10 is fed to the heat press rolls 12. The heat press rolls 12 as an example include a pair of rolls arranged at a predetermined distance in the vertical direction C. Each roll has a built-in heater, and the surface of each roll is heated to a predetermined temperature, for example, between around 400° C. and 800° C. By passing between the pair of rolls, the green compact 14 are heated and pressurized to become a sintered body.

Figure 2A:
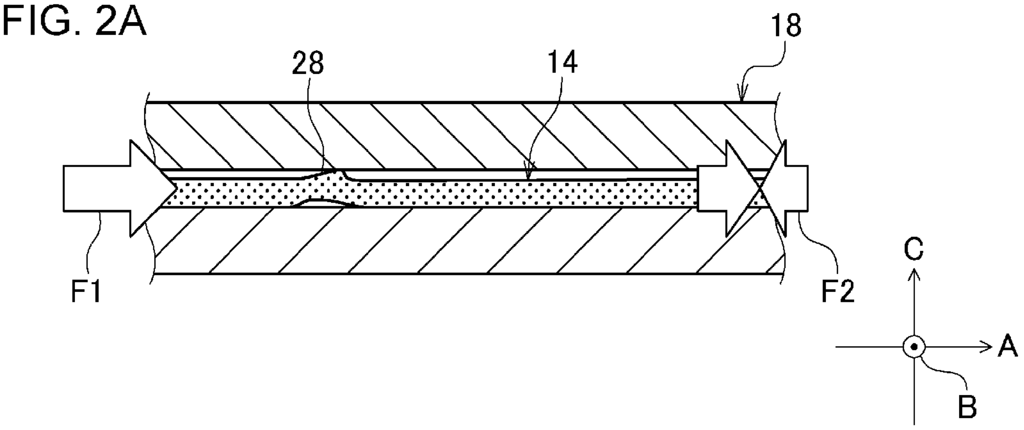
FIGS. 2A, 2B and 2C are schematic diagrams showing the condition of a green compact inside the conveyance path.
Figure 2B:
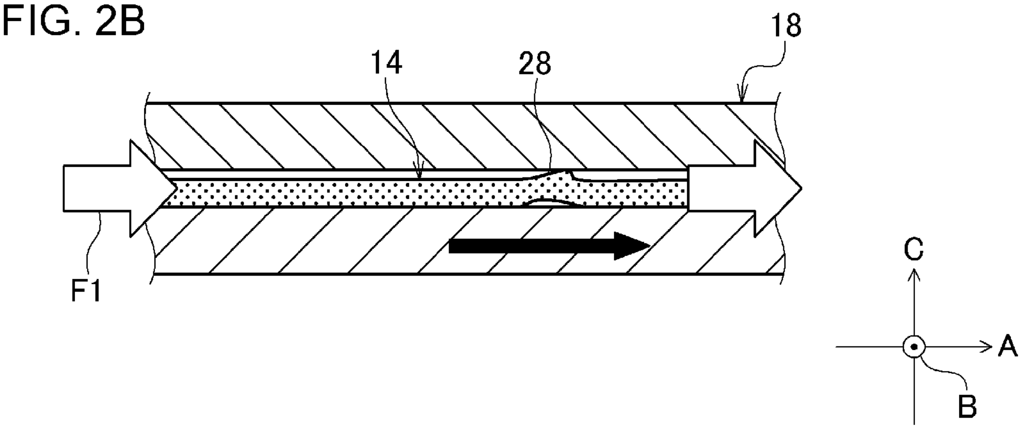
Figure 2C:
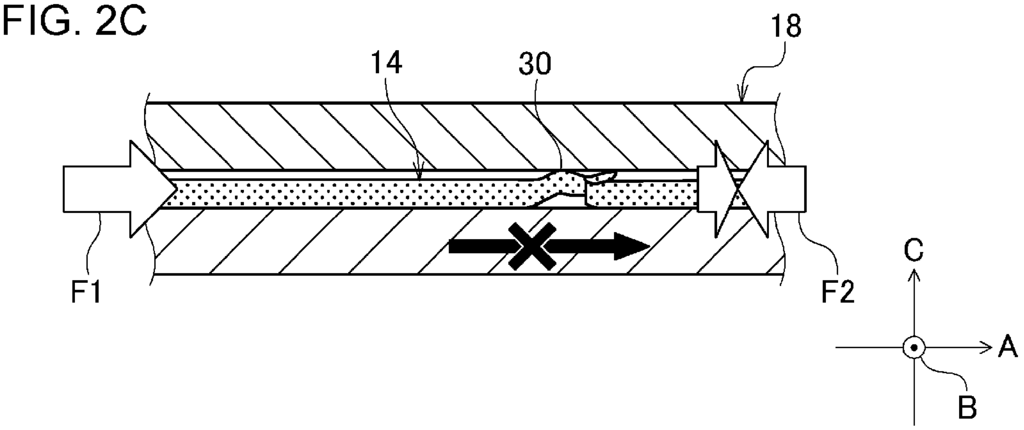

Buckling that occurs in the green compact 14 that is being conveyed will now be explained. FIGS. 2A to 2C are schematic diagrams showing the condition of the green compact 14 inside the conveyance path 18. When a failure occurs in the conveyance of the green compact 14, the green compact 14 is subjected to an extrusion force F1 by the extrusion part 26 (press rolls 6) from the upstream side and a reaction force F2 in the opposite direction of the extrusion force F1 from the downstream side, as shown in FIG. 2A. An example of a failure in the conveyance is a clogging of the conveyance path 18 caused by, e.g., the accumulation of some of the powder 16 that have fallen out of the green compact 14. Another example is the stopping of the heat press rolls 12. Another example is the difference in rotational speed between the press rolls 6 and the heat press rolls 12, in other words, the difference in the conveying speed of the green compact 14. Furthermore, another example is that when the green compact 14 is extended by the heat press rolls 12, a part of the green compact 14 extends toward the upstream side.

When the extrusion force F1 and the reaction force F2 are applied to the green compact 14, a part of the green compact 14 is deformed such that the part escapes into the gap with the ceiling surface 24, forming a bent part 28. The green compact 14 tends to deform so as to form a bent part 28 starting from a part of the green compact having a lower density or a thinner thickness than the surroundings. The extrusion force F1 is transmitted substantially evenly to the downstream side of the bent part 28. Therefore, as long as the bent part 28 is formed, the conveyance of the green compact 14 can be continued. Therefore, if the failure in the conveyance is resolved and the reaction force F2 disappears or if the reaction force F2 is small relative to the rigidity of the green compact 14, the conveyance of the green compact 14 can be continued without further growth of the bent part 28, as shown in FIG. 2B.

On the other hand, as shown in FIG. 2C, if the generated reaction force F2 exceeds the rigidity of the green compact 14, the bent part 28 grows and results in buckling. In other words, the green compact 14 breaks and collapses at the bent part. If multiple bent parts 28 are formed, a bent part 28 with the largest amount of bending typically results in buckling. When a buckled part 30 is formed in the green compact 14, it becomes difficult for the extrusion force F1 to be evenly transmitted to the downstream side of the buckled part 30. As a result, the conveyance of the green compact 14 becomes stagnant. Therefore, it is necessary to remove the buckled part 30 so as to restore the conveyance of the green compact 14.

Figure 3A:
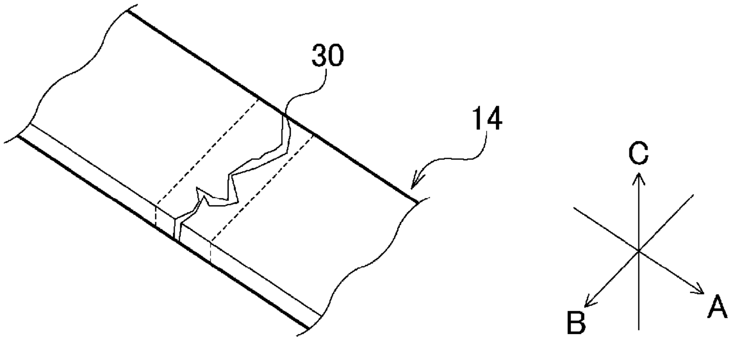
FIGS. 3A, 3B, 3C and 3D are schematic diagrams for explaining restoration work for the conveyance of the green compact.
Figure 3B:
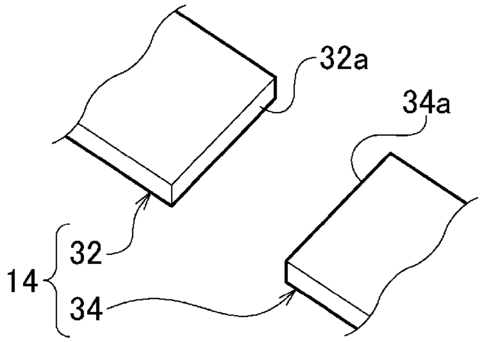

FIGS. 3A to 3D are schematic diagrams for explaining restoration work for the conveyance of the green compact 14. As shown in FIG. 3A, when a buckled part 30 is formed in the green compact 14, the extrusion part 26 is stopped and the buckled part 30 is then cut off as shown in FIG. 3B. At this time, a part on the upstream side of the buckling site and a part on the downstream side of the buckling site are also cut off as buckled parts 30. An end surface 32a of an upstream part 32 located on the upstream side of the buckled part 30 and an end surface 34a of a downstream part 34 located on the downstream side of the buckled part 30 are arranged so as to be parallel to each other. Preferably, the end surfaces 32*a* and 34*a* are arranged so as to be perpendicular to the conveyance direction A.

Figure 3C:
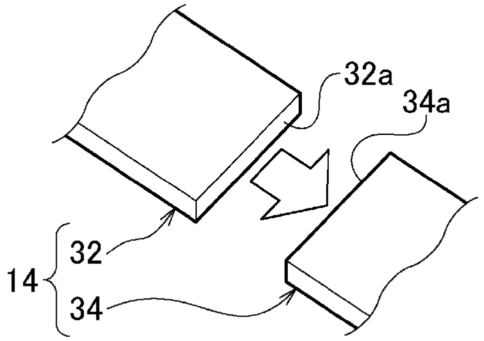
Figure 3D:
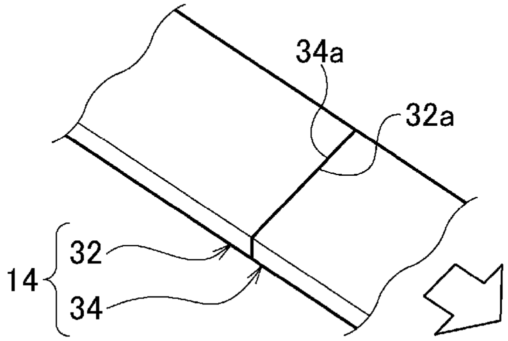

In this state, as shown in FIG. 3C, the extrusion of the upstream part 32 by the extrusion part 26 is resumed. Thereby, the upstream part 32 approaches the downstream part 34. As shown in FIG. 3D, the end surface 32*a* of the upstream part 32 abuts on the end surface 34*a* of the downstream part 34. As a result, the extrusion force F1 from the extrusion part 26 is also evenly transmitted to the downstream part 34, and the conveyance of the entire green compact 14 is resumed.

In conventional conveying mechanisms, the above-mentioned restoration work is performed manually by the user. That is, the user stops the extrusion part 26, disassembles the conveyance path 18 so as to expose the inside thereof, locates the buckled part 30, and manually removes the buckled part 30 so as to resume the driving of the extrusion part 26. Therefore, the restoration work used to be very complicated, burdensome, and time-consuming.

Figure 4A:
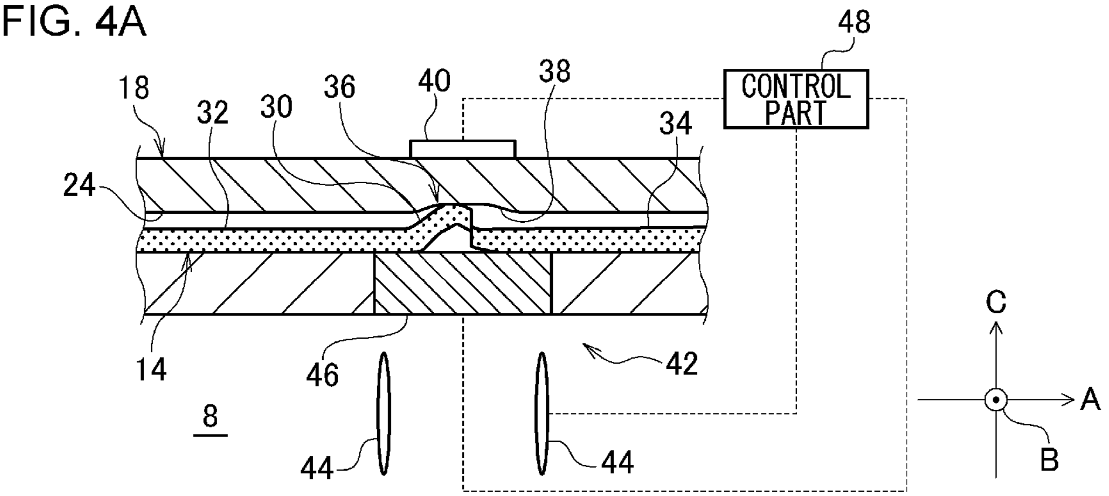
FIGS. 4A, 4B and 4C are schematic diagrams for explaining the configuration and operation of a green compact conveying mechanism.
Figure 4B:
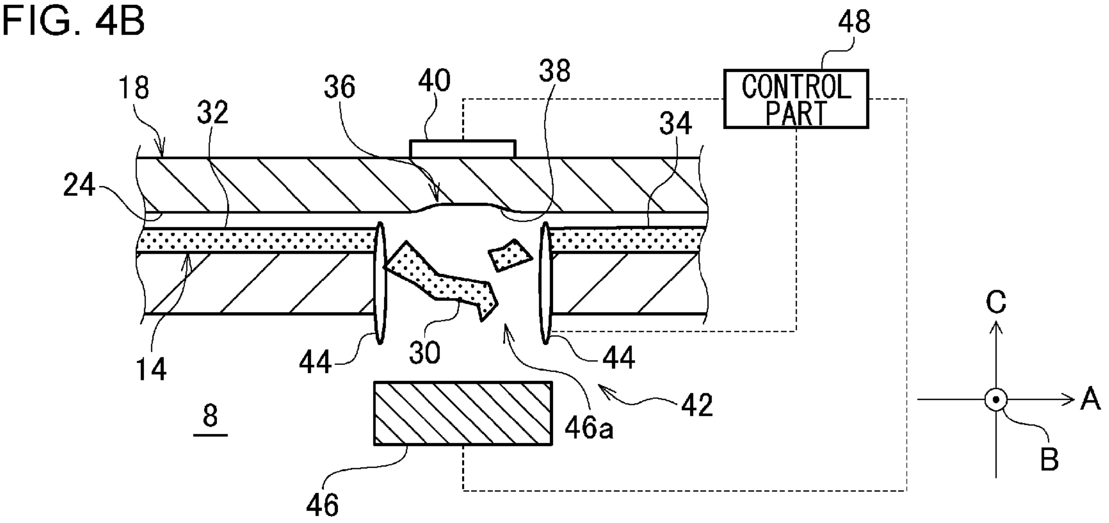
Figure 4C:
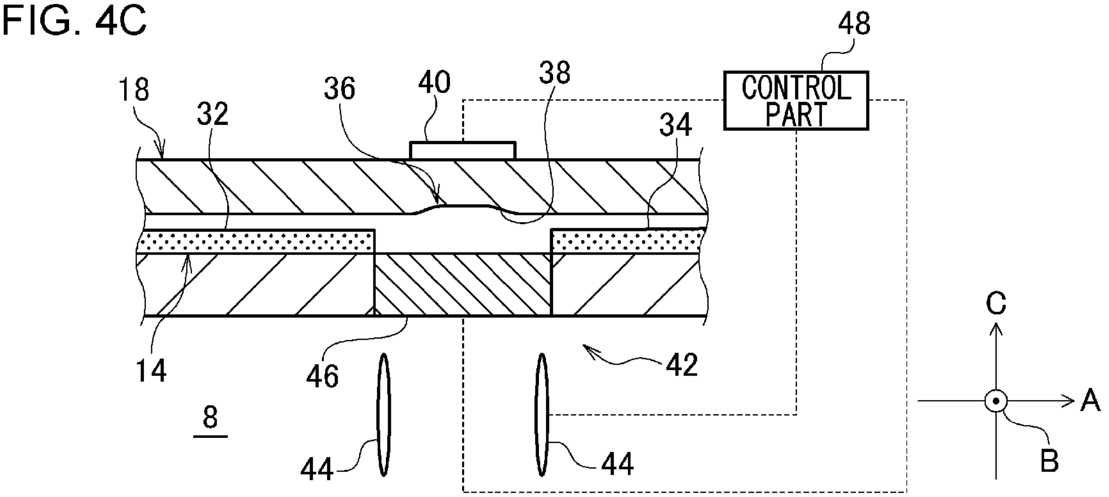

In contrast, the green compact conveying mechanism 8 according to the present embodiment includes the following configuration so as to thereby solve the above-mentioned problems. FIGS. 4A to 4C are schematic diagrams for explaining the configuration and operation of the green compact conveying mechanism 8. As shown in FIG. 4A, the green compact conveying mechanism 8 according to the present embodiment includes a buckling inducing part 36.

The buckling inducing part 36 is arranged in the conveyance path 18 so as to make it easy to locally bend the green compact 14 and induce buckling at the site. The buckling inducing part 36 can be provided at any position on the downstream side of the extrusion part 26 (see FIG. 1). The buckling inducing part 36 according to the present embodiment includes a locally elevated part of the ceiling surface 24 of the tunnel of the conveyance path 18. In other words, a recess provided in the ceiling surface 24 constitutes the buckling inducing part 36.

When the extrusion force F1 and the reaction force F2 are input to the green compact 14, deformation leading to a bent part 28 can begin to occur at several sites on the green compact 14. These deformations of the green compact 14 are at least temporarily suppressed by the ceiling surface 24. On the other hand, the ceiling surface 24 is locally elevated at the buckling inducing part 36. Therefore, while the deformations of the green compact 14 are suppressed by the ceiling surface 24 except for the installation site of the buckling inducing part 36 the green compact 14 continues to deform at the installation site of the buckling inducing part 36. As a result, a bent part 28 can be intentionally formed at the installation site of the buckling inducing part 36. The bent part 28 then grows further, resulting in buckling. In other words, buckling is induced by the buckling inducing part 36.

Compared to the difference in the susceptibility to deflection due to the physical properties (density and thickness) of the green compact 14, the difference in the susceptibility to deflection due to the presence or absence of a holding-down action by the ceiling surface 24 is much larger. Therefore, by raising a part of the ceiling surface 24 and using this raised part as a buckling inducing part 36, buckling can be induced at a high frequency by the buckling inducing part 36. This makes it possible to limit the site where the buckled part 30 is formed, thereby reducing the burden and time required for restoration work.

The buckling inducing part 36 according to the present embodiment has a tapered part 38 whose height decreases toward the downstream side of the conveyance path 18. The tapered part 38 is provided at the boundary between the buckling inducing part 36 and a part on the downstream side of the buckling inducing part 36 and is inclined such that the height decreases toward the downstream side. If the bent part 28 does not result in buckling due to the disappearance of the reaction force F2 or the like, the bent part 28 is conveyed to the downstream side of the buckling inducing part 36. At this time, the bent part 28 advances to the downstream side while the top thereof is gradually held down due to the bent part 28 abutting on the tapered part 38. This suppresses the bent part 28 from being scraped due to height differences in the ceiling surface 24 and the powder 16 from falling out.

The green compact conveying mechanism 8 according to the present embodiment includes a sensor 40 and a removal part 42. The sensor 40 detects the occurrence of buckling in the buckling inducing part 36. The sensor 40 is not particularly limited as long as the sensor 40 can detect the formation of the buckled part 30 and can consist of a publicly-known pressure sensor such as a piezoelectric sensor and a strain sensor, for example. As an example, the sensor 40 is installed in an area corresponding to the buckling inducing part 36 on the outer surface of the conveyance path 18. The sensor 40 then detects the pressure applied when the buckled part 30 presses the buckling inducing part 36. The sensor 40 may be installed inside the conveyance path 18. In this case, for example, the pressure applied when the buckled part 30 directly presses the sensor 40 is detected. The sensor 40 transmits a signal indicating the detection result to the removal part 42.

The removal part 42 removes the buckled part 30 in accordance with the detection result from the sensor 40. The removal part 42 has a cutting part 44, a collection part 46, and a control part 48. The cutting part 44 separates the buckled part 30 from other adjacent parts (i.e., the upstream part 32 and the downstream part 34). The cutting part 44 as one example includes a pair of cutting blades that can advance and retract with respect to the buckling inducing part 36. The pair of cutting blades are arranged side by side in the conveyance direction A so as to sandwich the buckling inducing part 36. The collection part 46 collects the buckled part 30 separated by the cutting part 44. The collection part 46 as an example has a structure in which the floor surface 20 facing the buckling inducing part 36 slides. In other words, the floor surface 20 facing the buckling inducing part 36 is an opening and closing floor. The floor surface 20 slides so as to thereby form a collection hole 46*a* that connects the inside and outside of the conveyance path 18. The buckled part 30 falls through the collection hole 46*a* and then collected. The floor surface 20 may open and/or close the collection hole 46*a* by rotating about a hinge as a fulcrum. In other words, the collection hole 46*a* may be provided with a sliding door or a hinged door.

The driving of the cutting part 44 and the collection part 46 is controlled by the control part 48. In other words, the control part 48 controls the advancing and retreating of the cutting blades and the sliding of the floor surface 20. The control part 48 is implemented by an element such as a CPU or memory of a computer or by a circuit as a hardware configuration, and by a computer program or the like as a software configuration. It will be obvious to those skilled in the art that the control part 48 may be implemented in a variety of manners by a combination of hardware and software.

As shown in FIG. 4A, when the buckled part 30 is formed, the control part 48 can receive a signal from the sensor 40 so as to learn the generation of the buckled part 30. Upon learning the generation of the buckled part 30, the control part 48 slides the collection part 46 so as to make the collection hole 46*a* appear, as shown in FIG. 4B. Further, the cutting part 44 is advanced through the collection hole 46*a* toward the buckling inducing part 36. As a result of this, the boundary between the buckled part 30 and the upstream part 32 and the boundary between the buckled part 30 and the downstream part 34 are cut off, and the buckled part 30 is separated. The separated buckled part 30 falls through the collection hole 46*a* and is then collected. The control part 48 then retracts the cutting part 44 from the buckling inducing part 36 and slides the collection part 46 so as to close the collection hole 46*a*, as shown in FIG. 4C. As a result, the conveyance of the green compact 14 can be resumed.

The extrusion part 26 is stopped when a buckled part 30 is formed, and the driving of the extrusion part 26 is resumed when the removal of the buckled part 30 is completed. This control of the extrusion part 26 may be performed by the control part 48 or by another control part. Further, along with an opening/closing door or instead of the opening/closing door, the collection part 46 may include a mechanism for suctioning the separated buckled part 30. There may be a plurality of buckling inducing parts 36.

As explained above, the green compact conveying mechanism 8 according to the present embodiment includes: a conveyance path 18 for a green compact 14 obtained by compressively forming powder 16 in a sheet shape; an extrusion part 26 that sends the green compact 14 to the downstream side of the conveyance path 18 by extruding the green compact 14; and a buckling inducing part 36 that is arranged in the conveyance path 18, causes the green compact to be easily bent locally, and induces buckling at that site. Thus, by providing the buckling inducing part 36, when a reaction force F2 is input to the green compact 14 that is being conveyed and the reaction force F2 exceeds the rigidity of the green compact 14, a buckled part 30 can be formed at a fixed site of the green compact 14. Thereby, the burden on the restoration work of the conveyance of the green compact 14 can be reduced, and the work time can be shortened. Thus, the operating rate of the green compact conveying mechanism 8 can be improved. As a result, the throughput of the green compact forming device 1 equipped with the green compact conveying mechanism 8 can be improved.

The conveyance path 18 according to the present embodiment has a tunnel shape that extends in the conveyance direction A of the green compact 14. This makes it easier to maintain the shape of the green compact 14 during the conveyance. The buckling inducing part 36 includes a locally elevated part of the ceiling surface 24 of the conveyance path 18. This allows buckling induction to be achieved with a simple structure.

The buckling inducing part 36 has a tapered part 38 whose height decreases toward the downstream side of the conveyance path 18. Thereby, when the bent part 28 formed by the buckling inducing part 36 moves to the downstream side without resulting in buckling, the bent part 28 can enter the downstream side while the height of the bent part 28 is gradually lowered. Therefore, the top of the bent part 28 can be prevented from being scraped and the powder 16 can be prevented from falling out. As a result, the occurrence of clogging of the conveyance path 18 can be suppressed.

The green compact conveying mechanism 8 according to the present embodiment includes a sensor 40 that detects the occurrence of buckling in the buckling inducing part 36 and a removal part 42 that removes a buckled part 30 in accordance with the detection result from the sensor 40. Further, the removal part 42 has a cutting part 44 that separates the buckled part 30 from the rest and a collection part 46 that collects the separated buckled part 30. This allows the work of removing the buckled part 30 to be automated. Therefore, the burden on the restoration work of the conveyance of the green compact 14 can be further reduced, and the work time can be further shortened. As a result, the operating rate of the green compact conveying mechanism 8 can be further improved.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the constituting elements included in each embodiment are also valid as embodiments of the present disclosure. Hatching applied to a cross section of a drawing does not limit the material of an object to which the hatching is applied.

(First Exemplary Variation)

Figure 5A:
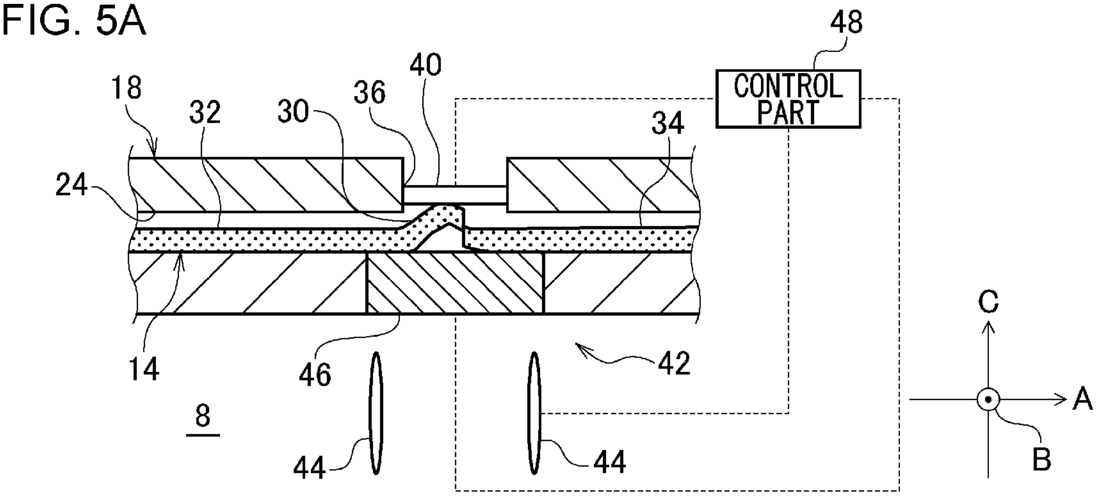
FIG. 5A is a schematic diagram for explaining the configuration of a green compact conveying mechanism according to the first exemplary variation.

FIG. 5A is a schematic diagram for explaining the configuration of a green compact conveying mechanism 8 according to the first exemplary variation. The green compact conveying mechanism 8 according to the present exemplary variation has a buckling inducing part 36 including a part of the ceiling surface 24 of the conveyance path 18 that is locally open. In other words, a through hole provided in the ceiling surface 24 constitutes the buckling inducing part 36. This exemplary variation also allows buckling to be induced at a fixed position. Therefore, the same effects as those obtained in the embodiment can be achieved. The tapered part 38 can also be provided in the present exemplary variation.

(Second Exemplary Variation)

Figure 5B:
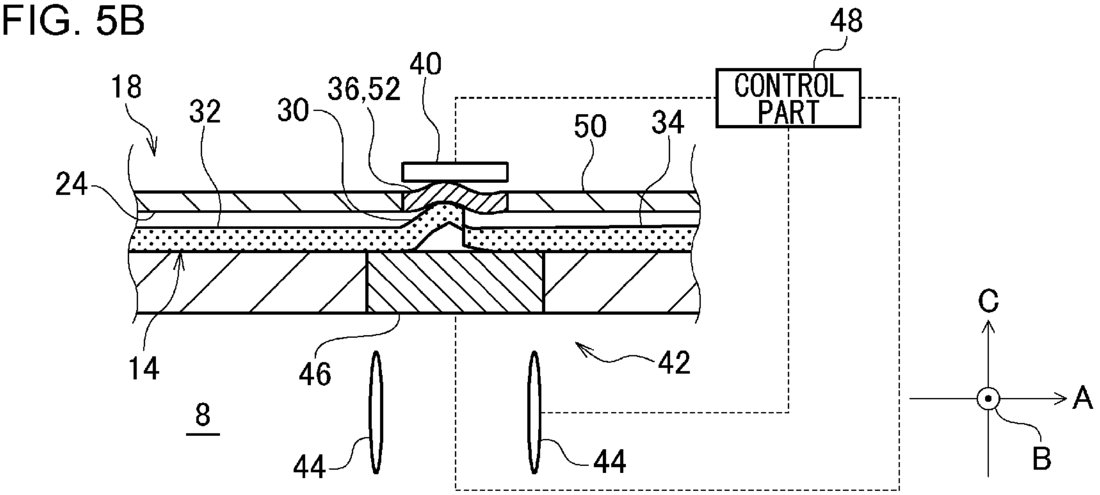
FIG. 5B is a schematic diagram for explaining the configuration of a green compact conveying mechanism according to the second exemplary variation.

FIG. 5B is a schematic diagram for explaining the configuration of a green compact conveying mechanism 8 according to the second exemplary variation. The green compact conveying mechanism 8 according to the present exemplary variation has a buckling inducing part 36 including a part of the ceiling surface 24 of the conveyance path 18 where the flexibility is locally increased. In other words, the ceiling surface 24 has a low flexibility part 50 and a high flexibility part 52 whose flexibility is higher than that of the low flexibility part 50. The high flexibility part 52 constitutes the buckling inducing part 36. The low flexibility part 50 can be made of a metal such as stainless steel or an aluminum alloy or a ceramic material such as silicon nitride, alumina, zirconia, or the like. The high flexibility part 52 can be made of resin such as polyethylene (PE) and acrylonitrile butadiene styrene copolymer (ABS), which are general-purpose plastics, and polyacetal (POM) and polycarbonate (PC), which are engineering plastics, for example. This exemplary variation also allows buckling to be induced at a fixed position. Therefore, the same effects as those obtained in the embodiment can be achieved. The tapered part 38 can also be provided in the present exemplary variation.

The embodiments may be defined by the items described in the following.

[Item 1]

A green compact conveying mechanism (8) including:

a conveyance path (18) for a green compact (14) obtained by compressively forming powder (16) in a sheet shape;

an extrusion part (26) that sends the green compact (14) to the downstream side of the conveyance path (18) by extruding the green compact (14); and a buckling inducing part (36) that is arranged in the conveyance path (18), causes the green compact (14) to be easily bent locally, and induces buckling at that site.

[Item 2]

The green compact conveying mechanism (8) according to Item 1, wherein the conveyance path (18) has a tunnel shape that extends in a conveyance direction (A) of the green compact (14), and the buckling inducing part (36) includes a locally elevated part of a ceiling surface (24) of the conveyance path (18).

[Item 3]

The green compact conveying mechanism (8) according to Item 2, wherein the buckling inducing part (36) has a tapered part (38) whose height decreases toward the downstream side of the conveyance path (18).

[Item 4]

The green compact conveying mechanism (8) according to Item 1, wherein the conveyance path (18) has a tunnel shape that extends in a conveyance direction (A) of the green compact (14), and the buckling inducing part (36) includes a part of a ceiling surface (24) of the conveyance path (18) that is locally open.

[Item 5]

The green compact conveying mechanism (8) according to Item 1, wherein the conveyance path (18) has a tunnel shape that extends in a conveyance direction (A) of the green compact (14), and the buckling inducing part (36) includes a part of a ceiling surface (24) of the conveyance path (18) where the flexibility is locally increased.

[Item 6]

The green compact conveying mechanism (8) according to any one of Items 1 through 5, including:

a sensor (40) that detects the occurrence of buckling in the buckling inducing part (36); and a removal part (42) that removes a buckled part (30) in accordance with a detection result from the sensor (40).

[Item 7]

The green compact conveying mechanism (8) according to Item 6, wherein the removal part (42) has a cutting part (44) that separates the buckled part (30) from the rest and a collection part (46) that collects the separated buckled part (30).

[Item 8]

A green compact forming device (1) including:

press rolls (6) that compressively form powder (16) into a sheet shape; and the green compact conveying mechanism (8) according to any one of Items 1 through 7, wherein the press rolls (6) serve as the extrusion part (26) of the green compact conveying mechanism (8).

The invention claimed is:

1. A green compact conveying mechanism comprising:

a conveyance path for a green compact obtained by compressively forming powder in a sheet shape;

an extrusion part that sends the green compact to a downstream side of the conveyance path by extruding the green compact; and a buckling inducing part that is arranged in the conveyance path, causes a portion of the green compact at a position corresponding to the buckling inducing part to bend, and induces buckling of the green compact at that site.

2. The green compact conveying mechanism according to claim 1, wherein the conveyance path has a tunnel shape that extends in a conveyance direction of the green compact, and the buckling inducing part comprises a locally elevated part of a ceiling surface of the conveyance path.

3. The green compact conveying mechanism according to claim 2, wherein the buckling inducing part has a tapered part whose height decreases toward the downstream side of the conveyance path.

4. The green compact conveying mechanism according to claim 1, wherein the conveyance path has a tunnel shape that extends in a conveyance direction of the green compact, and the buckling inducing part comprises a part of a ceiling surface of the conveyance path that is locally open.

5. The green compact conveying mechanism according to claim 1, wherein the conveyance path has a tunnel shape that extends in a conveyance direction of the green compact, and the buckling inducing part comprises a part of a ceiling surface of the conveyance path where the flexibility is locally increased.

6. The green compact conveying mechanism according to claim 1, comprising:

a sensor that detects an occurrence of the buckling in the buckling inducing part; and a removal part that removes a buckled part in accordance with a detection result from the sensor.

7. The green compact conveying mechanism according to claim 6, wherein the removal part has a cutting part that separates the buckled part from the rest and a collection part that collects the separated buckled part.

8. A green compact forming device comprising:

press rolls that compressively form powder into a sheet shape; and the green compact conveying mechanism according to claim 1, wherein the press rolls serve as the extrusion part of the green compact conveying mechanism.

* * * * *